UNITED STATES PATENT OFFICE.

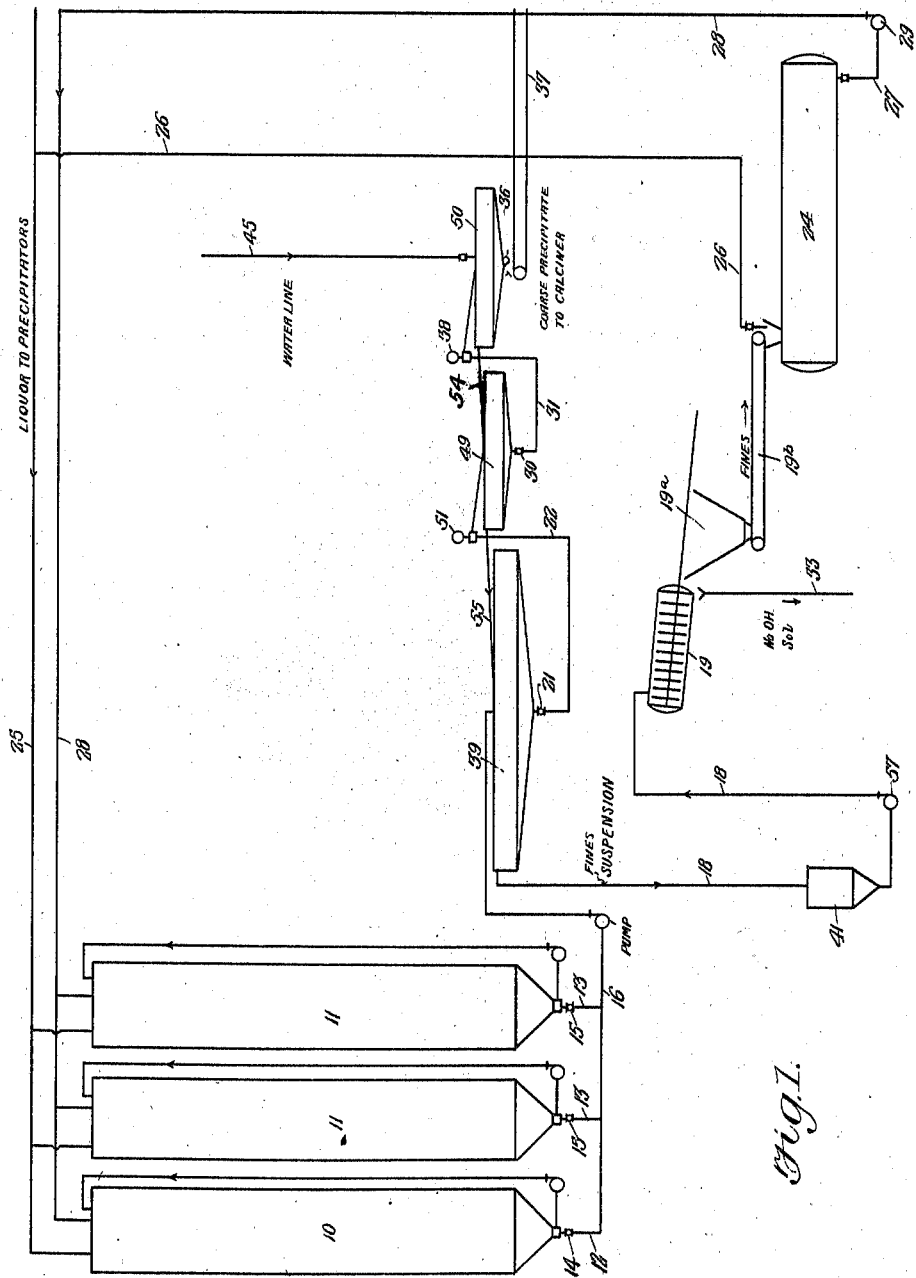

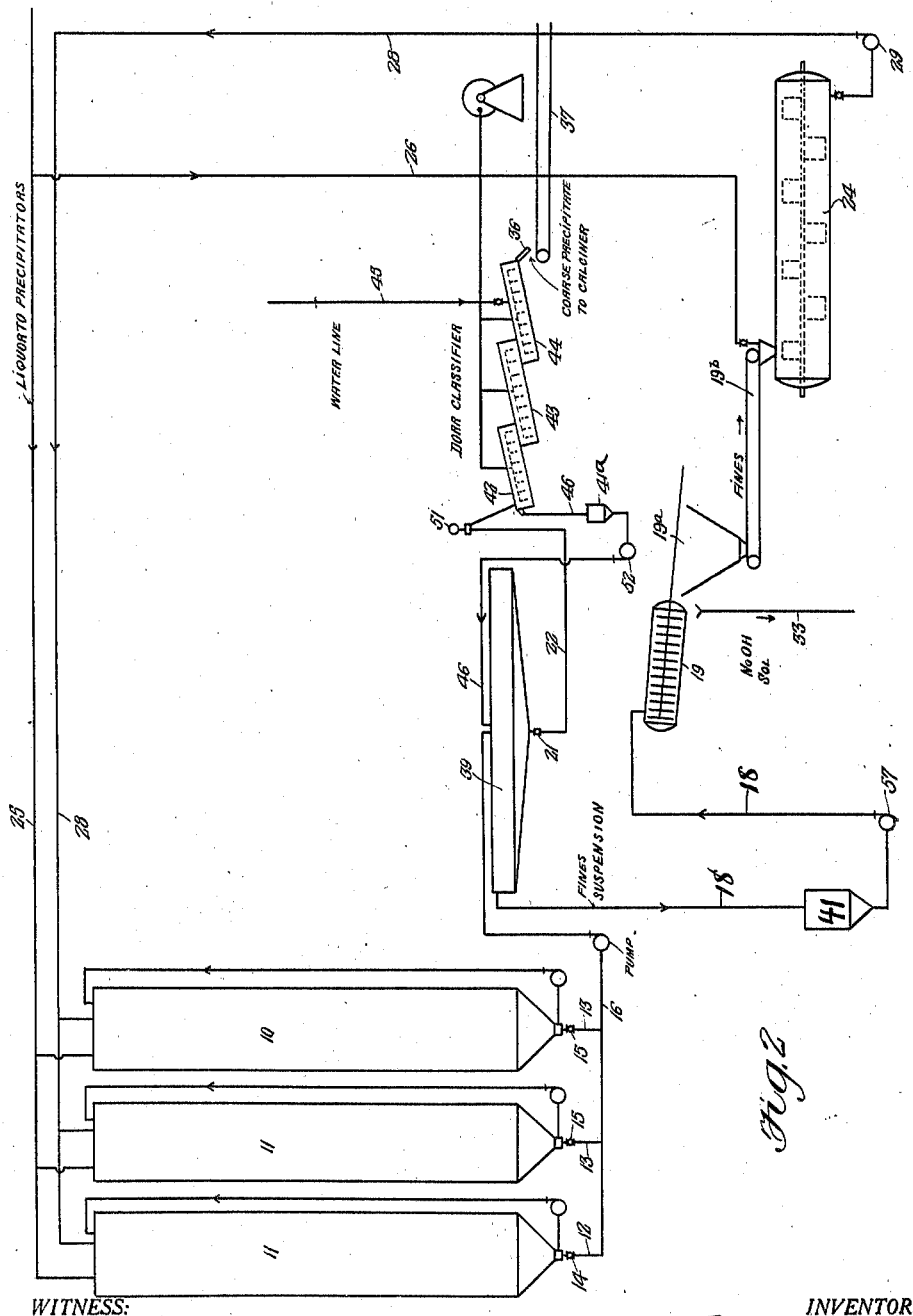

RALPH S. SHERWIN, OF ST. LOUIS, MISSOURI, ASSIGNOR TO ALUMINUM COMPANY OF AMERICA, OF PITTSBURGH, PENNSYLVANIA, A CORPORATION OF PENNSYLVANIA.

PRODUCTION OF ALUMINUM OXID.

1,315,045.  Specification of Letters Patent.  Patented Sept. 2, 1919.

Application filed June 20, 1919. Serial No. 305,621.

*To all whom it may concern:*

Be it known that I, RALPH S. SHERWIN, a citizen of the United States, residing at St. Louis, in the State of Missouri, have invented certain new and useful Improvements in the Production of Aluminum Oxid, of which the following is a full, clear, and exact description.

In my two co-pending applications Numbers 197,593 and 197,594, filed October 20, 1917, respectively, I have described and claimed a process and apparatus for the preparation of alumina by first precipitating aluminum hydrate from sodium (alkali metal) aluminate liquor by the method of the re-issue patent of Fickes No. 13,668, and my prior Patent 1,251,296 of December 25, 1917, then separating such precipitated material into two fractions, namely, the coarse precipitate and the fine precipitate, then separately separating (*e. g.*, filtering) the liquors carrying such coarse precipitate and such fine precipitate to remove the liquids from the solids, after which the coarse precipitate may be calcined to produce aluminum oxid, and the fine precipitate is mixed with an additional quantity of sodium aluminate liquor and returned to the precipitation stage. The present invention has for its object to produce certain refinements in the operation whereby the separation of the coarse precipitate from the fine precipitate is made more complete, the removal of soluble material from the coarse precipitate prior to calcination is made more complete, and is accomplished more economically, and the entire process after the precipitation operation is rendered more nearly automatic and requires less attendance. These, and other improved results are produced by the novel procedure herein described, and by the use of the novel apparatus shown illustratively in the accompanying drawings in which Figure 1 represents a side elevation of an apparatus in which the coarse material is run through a mechanical washing and classifying apparatus, shown as a series of two small thickeners, constructed like the separator 39, but smaller, while the entire bulk of liquor and washings pass to a filter press, shown illustratively as a Kelly filter. Fig. 2 shows a somewhat similar apparatus in which a series of three Dorr classifiers are employed. It will thus be seen that a feature of the present invention consists in the substitution for a filter press (in which the coarse material is removed from the liquor in my prior applications referred to), of a classifier or thickener or dewaterer.

Referring particularly to said drawings, 10 and 11, indicate precipitation tanks of the kind referred to, in the Fickes patent or my prior patent above referred to, any suitable number of these being employed. The liquid discharged at the conical bottom outlets of these, passing through outlet pipes 12, 13 provided with suitable regulating valves 14, 15 through a common pipe 16 to near the center of the flat settling tank or thickener 39. From the bottom of this tank the sludge consisting largely of the coarse precipitate flows through the outlet valve 21 through pipe 22. In the apparatus shown in Fig. 2, the liquid flowing through the pipe 22 passes to a suitable classifying and washing apparatus here illustrated as consisting of three Dorr classifiers 42, 43 44. To the last of these classifiers is introduced a suitable quantity of water through pipe 45, this water flowing through the classifiers in the direction opposite to the flow of the coarse precipitate therein. In the classifiers 43 and 44, this water removes from the material substantially all of its content of soluble sodium compounds and fine precipitated aluminum hydrate and in the classifier 42 the wash water also displaces a large fraction of that portion of the caustic soda solution which flows through the pipe 22. In actual practice about 10% of the total amount of liquor flows through the valve 21 and pipe 22, this carrying from 80 to 90% of the total precipitate entering the thickener 39, and including substantially all of the coarse precipitated hydrate, and only a small quantity of the fine precipitated hydrate. The liquor from 42 passes by pipe 46 into the thickener 39, preferably being introduced at a point near the center of the top of the thickener. A regular tank 41ª may be placed in the pipe line 46. By this means, the separation of the fine from the coarse aluminum hydrate is made more complete.

The thickened coarse precipitate after washing is discharged from the classifier 44 through the spout 36 onto the conveyer 37, by which it is conveyed to the calcining apparatus, or to any other suitable point. A device may also be employed to further dewater the material coming through the spout 36 before the same goes to the calciner.

As illustrated, a pump may be interposed in the pipe connection 46, in order to more accurately regulate the flow of liquid through this. If desired, however, the devices 42, 43, 44 may be placed at a higher level so that the liquid overflowing through pipe 46 may discharge by gravity into the thickener 39. A pump 51, for example a diaphragm pump, may conveniently be employed in the pipe line 22 so as to carefully regulate the amount of liquor flowing through the pipe 22 and hence the relative volume of liquid and sludge which will flow through the pipe as compared with the volume of the overflow from the thickener 39. The overflow from the thickener 39 may flow through the pipe 18 to a filter press 19 conveniently of the type known as the "Kelly" filter. The liquid consisting essentially of caustic soda solution with some alumina in solution, may be drawn off through pipe 33 to the dissolving tank in which bauxite is treated with caustic soda to produce sodium aluminate for reintroduction through pipe 25. The cakes collected in the filter and consisting of aluminum hydrate in a fine state of subdivision may be dumped into the hopper 19$^a$ and conveyed by the conveyer 19$^b$ into the mixing tank 24 in which they are mixed with sodium aluminate liquor entering through pipe 26, after which they are pumped up through pipe 28 into the precipitation tanks. It is not necessary to wash the precipitate collected in filter press 19.

Referring now to Fig. 1, the parts 10, 11, 12, 13, 14, 15, 16, 39, 21 and 22 operate exactly in the manner above described. In this apparatus, however, the sludge flows through the pipe 22 into the first of a series of small thickeners (two being shown in the drawing) 49 and 50. Any suitable number of these small thickeners may be employed, two, three or four ordinarily being sufficient. The liquor carrying the precipitate may flow by gravity or suitable pumps 51 and 38 may be inserted at the pipe lines for raising the liquors if desired, the use of pumps being ordinarily advisable as giving a more convenient means for regulating the flow of the liquor carrying the precipitate through this portion of the system. In ordinary practice about 10% of the liquor, carrying from 85 to 90% of the total amount of precipitate may pass through the valve 21 and pipe 22, this amount of precipitate including substantially all of the coarse precipitate and a very little of the fine material which it is desired to separate from the coarse for the reasons fully explained in my co-pending applications above referred to. By means of pipe 45, water is introduced into the last thickener, this water being for the purpose of washing the coarse precipitate both from soluble matter and from fine precipitate carried in suspension. The wash water overflows through pipe 54 leading to near the center of the thickener 49. It is, of course, understood that if three thickeners are employed, the wash water from the third thickener will run into the second, and the wash water from the second will run into the first. In the first thickener 49, the wash water will remove also from the precipitate the major portion of the soda liquor coming through the pipe 22. The overflow of wash water from the pipe 55 carrying the soluble matter of the material treated in the small thickeners and also carrying in suspension so much of the fine precipitate as is carried through the pipe 22, flows through pipe 55, and is introduced into the top of the large thickener 39, near the center thereof. The overflow of the liquor and fine precipitate from the thickener 39 flows through th pipe 18 to the filter 19, which may be the well known "Kelly" filter, the filtrate leaving through pipe 33 to the digestion apparatus in which bauxite is treated with caustic soda to form sodium aluminate. The solid material collected in the filter press 19 does not require washing and can be dumped into the hopper 19$^a$ from which it is carried by conveyer 19$^b$ into the tank 24, and it is there mixed with sodium aluminate entering by pipe 26. These are suitably agitated in the tank 24, pumped up through pipes 27 and 28 into the precipitators 10, 11, a suitable pump 29 being shown for this purpose.

The coarse material from the last thickener 50 may pass out through a suitable outlet spout 36, and this may be suitably dried or dewatered if desired, and conducted away by the conveyer 37 to a suitable calcining kiln or other device in which the aluminum hydrate is to be further treated.

In order to equalize the flow of liquid through the system, it is advisable to insert suitable equalizing tanks 41 in the pipe lines 18 and 46. It is also necessary to locate a pump 57 in a bend in the lower part of the pipe line 18 or elsewhere in this pipe line to force the liquid through the filter press 19.

The present application is in part a continuation of my said prior application 197,594, particularly as to the series of thickeners in which the sludge of coarse precipitate is treated.

I claim:

1. In the process of producing coarse aluminum hydrate from aluminate liquor, the improvement which comprises precipitating aluminum hydrate from said liquor by maintaining aluminum hydrate in suspended form therein, whereby both coarse and fine aluminum hydrate are formed; separating the bulk of the coarse precipitate from the bulk of the fine precipitate, subjecting the coarse precipitate to washing to separate the dissolved matter and fine precipitate therefrom, and adding the wash water to the precipitated aluminate liquor.

2. In the process of producing alumina from aluminate liquors, the steps of precipitating fine and coarse aluminum hydrate in said liquor; separating the resultant precipitated liquor into one fraction containing the larger bulk of the liquor carrying the larger portion of the fine precipitated hydrate, and a second fraction containing the larger portion of the coarse precipitated hydrate, a small part of the fine precipitated hydrate, and a small part of the alkaline solution; systematically washing such coarse precipitated hydrate to produce a wash water carrying the soluble content of the said second fraction and the fine precipitated hydrate content thereof, and removing such wash liquor from the precipitated coarse hydrate.

3. In the process of producing alumina from aluminate liquors, the steps of maintaining aluminum hydrate suspended in a solution of an alkali metal aluminate to precipitate coarse and fine aluminum hydrate in said liquor, separating the resultant precipitated liquor into two fractions, one of such fractions containing the larger bulk of the liquor carrying the larger bulk of the fine precipitated hydrate, and the second fraction containing the larger portion of the coarse precipitated hydrate, a small part of the fine precipitated hydrate and a small part of the alkaline solution; systematically washing such coarse precipitated hydrate to produce a wash water carrying the soluble content of the said second fraction and the fine precipitated content thereof, and returning such wash liquor to the stage of separation of the precipitated liquor into two fractions; removing the fine precipitate from the liquor constituting said first mentioned fraction, mixing said fine precipitate with an additional quantity of alkali metal aluminate liquor and returning such mixture to the precipitation stage of the process.

4. An apparatus for producing alumina from aluminate solution which comprises a tall precipitation receptacle having means for withdrawing sludge from near its bottom and for returning the same to the tank near its top, a means for separating the bulk of the coarse heavy precipitate from the bulk of the fine light precipitate, a washer for the coarse precipitate and connections for carrying the wash water to a point in the system not subsequent to the separation means, and means for conveying at least a part of the fine light precipitate back to the precipitation tank.

In testimony whereof I hereunto affix my signature.

RALPH S. SHERWIN.